United States Patent [19]

Babbitt et al.

[11] Patent Number: 5,589,928

[45] Date of Patent: Dec. 31, 1996

[54] METHOD AND APPARATUS FOR MEASURING DISTANCE TO A TARGET

[75] Inventors: W. Randall Babbitt, Bellevue; John A. Bell; Barbara A. Capron, both of Issaquah, all of Wash.; Peter J. deGroot, Middletown, Conn.; Ronald L. Hagman, Renton, Wash.; John A. McGarvey, Bellevue, Wash.; William D. Sherman; Paul F. Sjoholm, both of Renton, Wash.

[73] Assignee: The Boeing Company, Seattle, Wash.

[21] Appl. No.: 299,714

[22] Filed: Sep. 1, 1994

[51] Int. Cl.$^6$ .............................. G01B 11/02; G01C 3/00
[52] U.S. Cl. ...................... 356/4.1; 356/4.09; 356/5.09; 356/5.11; 356/358
[58] Field of Search .................................. 356/4.09, 4.1, 356/5.09, 5.11, 358

[56] References Cited

U.S. PATENT DOCUMENTS

| | | |
|---|---|---|
| 3,741,654 | 6/1973 | Brenholdt . |
| 4,093,380 | 6/1978 | White . |
| 4,171,907 | 10/1979 | Hill et al. . |
| 4,190,362 | 2/1980 | Dubrunfaut . |
| 4,229,102 | 10/1980 | Wiklund et al. . |
| 4,297,030 | 10/1981 | Chaborski . |
| 4,413,904 | 11/1983 | Hamada et al. . |
| 4,537,502 | 8/1985 | Miller et al. . |
| 4,715,706 | 12/1987 | Wang . |
| 4,744,653 | 5/1988 | Sano et al. . |
| 4,893,923 | 1/1990 | Javan . |
| 4,916,324 | 4/1990 | Meier . |
| 5,006,721 | 4/1991 | Cameron et al. . |

OTHER PUBLICATIONS

I. Moring, R. Myllylä, E. Honkanen, I. Kaisto, J. Kostamovaara, A. Mäkynen, M. Manninen, *New 3–D vision Sensor for Shape Measurement Applications*, SPIE vol. 1194 Optics, Illuminator and Image Sensing for Machine Vision (1989), pp. 232–242.

A. Greve and W. Harth, *Laser–diode Distance Meter in a KERN DKM 3A, Theodolite,* Applied Optics, vol. 23. No. 17 (1984), pp. 2982–2984.

A. J. Mäkynen, J. T. Kostamovaara, R. A. Myllylä, *Position Sensitive Detection Techniques for Manufacturing Accuracy Control,* SPIE vol. 1194 Optics, Illumination, and Image Sensing for Machine Vision IV (1989), pp. 243–252.

G. L. Abbas et al., *High–precision Fiber–optic Position Sensing Using Diode Laser Radar Techniques,* SPIE vol. 1219 Laser–Diode Technology and Applications II (1990) pp. 468–479.

K. G. Wesolowicz & R. E. Sampson, *Laser Radar Range Imaging Sensor for Commercial Applications,* SPIE vol. 783 Laser Radar II (1987), pp. 152–161.

(List continued on next page.)

*Primary Examiner*—Frank Gonzalez
*Assistant Examiner*—Amanda Merlino
*Attorney, Agent, or Firm*—Mary Y. Redman

[57] ABSTRACT

The invention performs coordinate measurement employing multiple-frequency intensity-modulated laser radar. A laser diode source is intensity modulated by variation of its excitation current. Its output beam is directed to a target using scanning mirrors or other opto-mechanical means, and the light returned from the target is detected. The modulation frequency is alternated between two or more values, creating a dataset of several relative phase measurements that uniquely determine the distance to the target without ambiguity. A device for carrying out such a method includes a laser whose output is modulated by a high frequency signal generator, optics for directing the output signal to the target to a detector, a signal generator which generates reference signals offset in frequency from the intensity modulation frequencies by a predetermined amount; mixers for combining the return signals with the reference signals to form a first set of intermediate frequency signals, and for combining the modulation signals with the reference signals to form a second set of intermediate frequency signals, and a computer which calculates phase differences between the output beam and the return signals for each modulation frequency from the intermediate frequencies, and determines the distance to the target from the phase differences.

11 Claims, 4 Drawing Sheets

OTHER PUBLICATIONS

A. R. Slotwinski et al., *Utilizing GaAlAs Laser Diodes as a Source for Frequency Modulated Continuous Wave (FMCW) Coherent Laser Radars,* SPIE vol. 1043 Laser Diode Technolog and Applications (1989), pp. 245–251.

Product Information Brochure, *Wild Theomat™T2002.*

Product Information Brochure, *Wild Autocat Automatic Theodolite Measurement System.*

Product Information Brochure, *Wild Leitz Mancat.*

Product Information Brochure, *Wild Theomat™T3000.*

Product Information Brochure, *Leica Smart 310 Measuring Movements.*

METHOD AND APPARATUS FOR MEASURING DISTANCE TO A TARGET

FIELD OF THE INVENTION

This invention relates generally to electro-optic range finders for mapping physical coordinates in three dimensions, and particularly to laser radar techniques for performing this mapping.

BACKGROUND OF THE INVENTION

An important part of the manufacturing process is coordinate measurement. It is used to map a test piece's shape and to coordinate jig tools. For some manufacturing applications, such as automobile and airplane manufacturing, coordinate measurement with an absolute RMS accuracy of 0.001 inch over a range of 0 to 40 feet would be highly desirable. Such accuracy has been difficult to obtain with currently available measurement techniques. Typically, the measurements are done mechanically, by using calipers or other mechanical gauges, or optically, by using geometric optics or laser radar.

Geometric optical techniques involve some form of triangulation, or determination of distance by comparing angular measurements from different points of view. Triangulation with theodolites may be computer controlled for speed and accuracy. At least two theodolite instruments are required, and setup and operation may be cumbersome and slow. Photogrammetry is another geometric technique involving computer analysis of photographs of the test piece taken with a special high resolution camera from three or more points of view. Photogrammetry can be much faster to set up and yield higher accuracy than triangulation with theodolites, but time-consuming development and analysis of the photographs is required.

Laser radar refers generally to "time-of-flight" sensors that determine distance by the propagation time for laser light. They have an advantage with respect to geometric techniques of coordinate measurement in that each measurement involves only one line of sight and the data acquisition does not involve photographic film or other materials that must be processed and analyzed, delaying results for long periods of time. The following articles discuss various examples of laser radar techniques for distance measurement.

An article entitled "Laser Radar Range Imaging Sensor for Commercial Applications" by K. G. Wesolowicz and Robert E. Sampson, *Proceedings of SPIE*, Vol. 783, p. 152 (1987), describes an imaging laser radar system employing a single frequency intensity modulation of a GaAlAs laser diode. The target range L is obtained from the following equation:

$$L = \frac{\phi}{2\pi} \frac{c}{2\upsilon}$$

where $\phi$ = measured phase delay due to time of flight;
c = speed of light; and
$\upsilon$ = modulation frequency.

Since the phase delay has an implicit $2\pi$ ambiguity, the range measurement has a corresponding ambiguity interval $L_a$ given by $$\frac{c}{2\upsilon}.$$

For example, for a modulation frequency $\upsilon$ of 0.72 GH$_z$, the interval $L_a$ is 8.2 inches. The 8.2 inch ambiguity interval must be resolved by some other means if this device is to be used for large-scale coordinate measurement on the order of 0 to 40 feet.

The article entitled "Laser-diode Distance Meter in a KERN DKM 3A Theodolite" by A. Greve and W. Harth, *Applied Optics*, Vol. 23, No. 17, p. 2982 (1984), describes an intensity-modulated laser radar that uses a phase locking technique to measure the relative phase. By varying the modulation frequency, the authors were able at least in principle to remove the ambiguity in the range measurement. However, it appears that this method results in an inadequate degree of accuracy for some applications.

The article entitled "High-Precision Fiber-Optic Position Sensing Using Diode Laser Radar Techniques" by G. Abbas, W. R. Babbitt, M. De la Chapelle, M. Fleshner, J. D. McClure, and E. Vertatschitsch, *Proceedings of SPIE*, Vol. 1219, p. 468 (1990), describes a linear position sensor with fiber-optic signal distribution. The sensor uses a frequency-chirped, intensity-modulated laser diode with an intensity-modulation bandwidth of 6 GHz. Absolute distance is obtained by determining the beat frequency between the laser modulation and the delayed modulation of the return signal. The beat frequency is found by high-speed digital Fourier transform of the beat signal. This approach has the important advantage that several sensor heads may be connected by fiber optics to the same source and detection module, provided that the possible variations in range to each of the heads do not overlap. However, absolute accuracies of 0.001 inch over 40 feet would require frequency chirps of very high linearity and chirp rates controlled to 2.5 ppm. These specifications may not be practical or cost-effective for this system.

In an article entitled "Utilizing GaAlAs Laser Diodes as a Source for Frequency Modulated Continuous Wave (FMCW) Coherent Laser Radars" by A. Slotwinski, F. Goodwin and D. Simonson, *Proceedings of SPIE*, Vol. 1043, p. 245 (1989), the authors describe an instrument that uses optical interferometry to generate beat signals between local and time-delayed optical frequencies. The frequency modulation is achieved by thermal tuning of a laser diode cavity length. The thermal tuning is easily effectuated by precisely controlled variation of the laser excitation current and is thus much easier to obtain over large bandwidths than an intensity-modulation chirp. However, this system has a maximum operational range of about 10 feet, which is inadequate for many applications and, like all coherent laser radars, it is sensitive to target surface roughness. Also, high accuracy and reliability can only be obtained with carefully characterized and monitored single-mode laser diodes.

The above exemplary measurement systems do not adequately meet the simultaneous requirements of very high absolute accuracy and large operational range necessary for the coordinate measurement applications which the present invention addresses. Further, these radars are not incorporated into an optical scanning system specifically designed for large-scale coordinate measurement using retro-reflectors or decals on the test piece as target points.

It is thus an object of this invention to meet accuracy and operational range requirements of 0.001 inch accuracy over a range of 0 to 40 feet using a reliable, cost-effective apparatus, that can be conveniently incorporated into a complete coordinate measurement system.

SUMMARY OF THE INVENTION

The invention provides a method and apparatus for performing coordinate measurement employing multiple-frequency intensity-modulated laser radar. In accordance with one embodiment of the inventive method, a first step intensity modulates a laser diode source by variation of its excitation current. A second step directs the beam to a target using scanning mirrors or other opto-mechanical means. A further step detects the light returned from the target. The final step alternates the modulation frequency between two or more values, creating a dataset of several relative phase measurements that uniquely determine the distance to the target without ambiguity.

A preferred embodiment of a device for carrying out such a method includes a source for an optical output signal which is intensity modulated at a plurality of frequencies (for example, a laser whose output is modulated by a microwave signal generator), optics for directing the output signal to the target and back; a detector for detecting the return signal reflected back from the target; a signal generator which generates reference signals offset in frequency from the intensity modulation frequencies; mixers for combining the return signals with the reference signals to form a first set of intermediate frequency signals, and for combining the modulation signals with the reference signals to form a second set of intermediate frequency signals; and a computer which calculates phase differences between the output beam and the return signals for each modulation frequency from the first and second set of intermediate frequencies, and determines the distance to the target from the phase differences.

The invention provides highly accurate measurements of distance. Readily-available crystal-controlled oscillators operating at high frequencies can be used to achieve this. Absolute range determination of up to 40 feet or more is obtained with three frequencies to resolve the ambiguity in the phase measurement. The invention can be made to operate with a wide variety of targets. The laser used in the invention may be of any type capable of providing spatially coherent light modulated at approximately 6 GHz. The constant-frequency system of the invention is easier and less expensive to implement than chirped systems and does not require expensive signal processing hardware. Signal processing may be performed using an ordinary personal computer with suitable input/output capabilities. The laser beam may be conveniently oriented in space with motorized scanning mirrors and computer control for target acquisition.

DETAILED DESCRIPTION OF THE DRAWINGS

Figure 1:
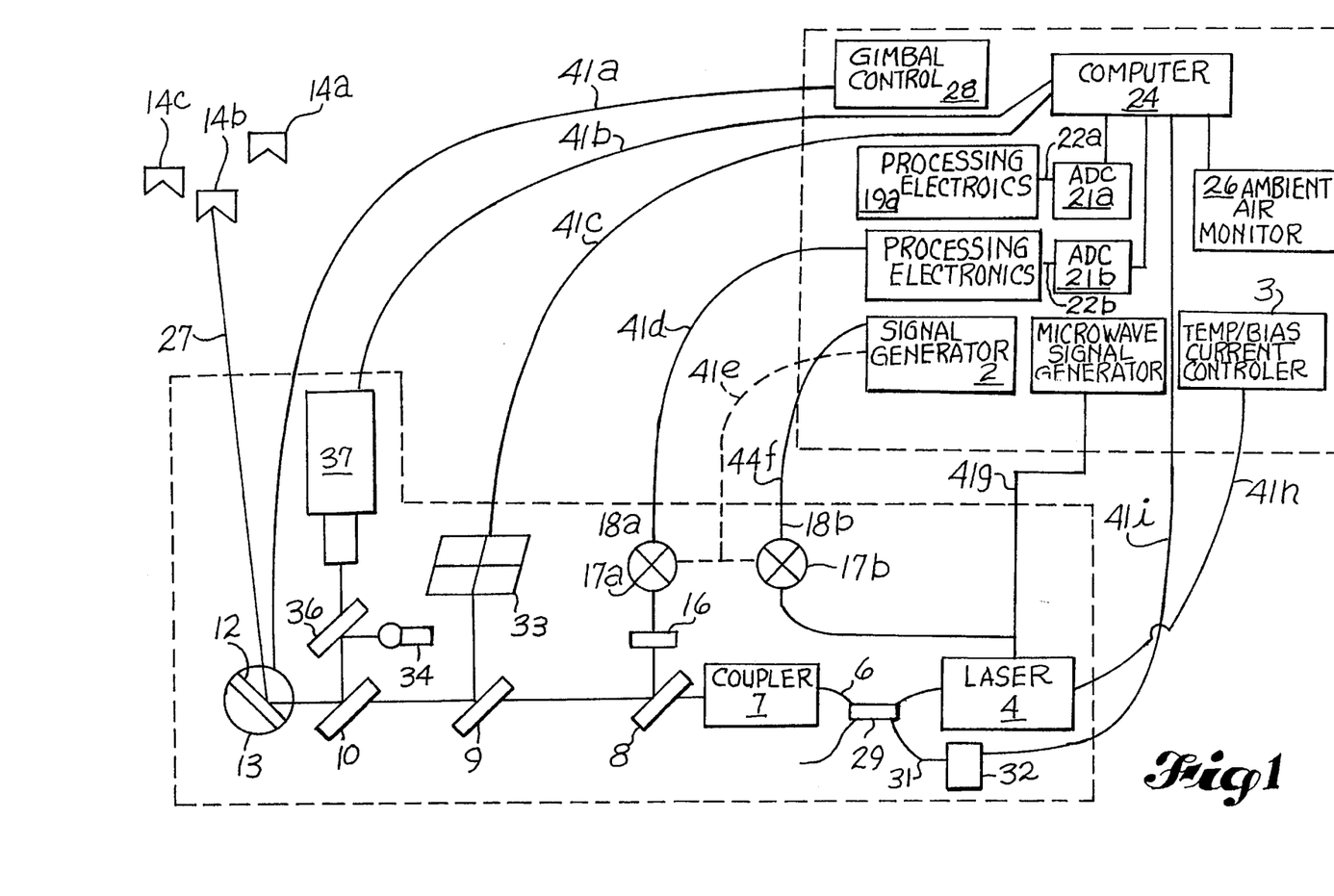
FIG. 1 is a schematic diagram of a preferred embodiment of the invention.

The invention determines distance by measurement of the phase delay of the laser intensity modulation incurred by traveling round trip to a target and back. Range ambiguity is resolved by the use of multiple frequency synthetic wavelength techniques. Referring to FIG. 1, in a first illustrated embodiment, the source of the intensity modulation of the laser beam is a microwave signal generator 1 that operates approximately in the range of 7 GHz and provides modulation frequencies accurate to 1 part in $10^6$. The exact frequencies are not critical and may vary substantially from those used here for purposes of illustration. In this embodiment, only one tone is generated at a time. A second signal generator 2 which is preferably locked to the same reference oscillator as generator 1 for accuracy, provides a frequency that is offset from the current frequency provided by first generator 1 by a fixed amount. The signal from the second generator 2 is used as the local oscillator signal in the phase detection process, as described below. For this particular embodiment, an offset frequency of 100 kHz could be chosen, but other offset frequencies may be utilized as desired. If, for example, modulation frequencies of 7 GHz, 7.010 GHz, and 7.3 GHz were used, there would be modulation frequency-offset frequency pairs of 7.0 GHz and 7.0001 GHz; 7.010 GHz and 7.0101 GHz; and 7.3 GHz and 7.3001 GHz.

The signal generator 1 is the modulation drive to a laser 4. A temperature/bias current controller 3 may be provided to maintain stable operation of the laser 4. In this illustrated embodiment, the laser 4 is a 7 milliwatt, fiber pigtailed, 1.3 micron multi-mode InGaAsP diode laser with an integrated optical isolator. The optical isolator ensures that light reflected back into the laser does not increase the laser's intensity noise or introduce a slight phase shift in the laser's intensity modulation. Alternatively, a laser with a separate optical isolator may be used. Under some circumstances, the optical isolator may not be required. An optical fiber pigtail 6 extending from the laser 4 is connected to an output coupler 7 that roughly collimates the beam. The beam then passes through beamsplitters 8, 9 and 10 to a mirror 12 mounted on a two axis gimbal 13. The gimbal mounted mirror 12 directs the beam to different targets 14a, b, c. Although three targets are shown for the sake of illustration, any number of targets may be used. In this embodiment, the targets 14a, b, c. are preferably open retroreflectors mounted in a compact housing, and are interchangeable with the targets currently used for photogrammetry and theodolites. Closed retroreflectors can also be used, as can other types of reflective targets, provided the signal to noise ratio is sufficiently high. The targets are mounted on the test piece to be measured by any convenient means.

From the target 14b (chosen for the sake of illustration only), the light beam retraces its path to beamsplitter 8, where the light is directed onto a high speed detector 16, which is sensitive to signals in the range of those generated by the microwave signal generator 1. In the illustrated embodiment, this is in the range of 7 GHz. The detected signal and the local oscillator signal from the second signal generator 2 are both input into a mixer 17a. This creates an intermediate frequency at the output 18a of the mixer 17a. The output signal 18a from mixer 17a is then filtered and amplified by processing electronics 19a. The signals from generators 1 and 2 are used as RF and LO inputs respectively to a second mixer 17b, which produces an output signal 18b which is filtered and amplified by processing electronics 19b, identical to those which filter and amplify the output 18a from the first mixer 17a. The purpose of the signal on reference channel 18b is to act as a reference phase, as will be evident from the discussion below.

The outputs from processing electronics 19a and 19b are digitized by high speed analog to digital converters (ADC) 21a and 21b. In the illustrated embodiment, two ADC's which operate in sync with each other are shown. Alternatively, a single ADC multiplexed to sample two channels could be used. In FIG. 1, there are two inputs 22a, 22b to the two ADC units 21a and 21b, with 400 KHz sampling on each input signal 22a, 22b. The intermediate frequency in this particular embodiment is the previously mentioned offset of 100 kHz. After being digitized, the signals from ADC units 21a, 21b are digitally IQ detected at 100 kHz in the computer 24. The I and Q outputs of each signal are the arguments to an arctangent routine which yields the phase of the signal relative to a digitized 100 kHz cosine wave. The output signal from the reference ADC 21b is used to determine the relative phase between the output of generator 1 and the digitized 100 kHz wave. By subtracting the phase of the output signal from reference ADC 21b from the phase of ADC 21a, the relative phase between the signal that traveled round trip to the target 14b and the signal at the output of generator 1 is determined. If the phase is measured at a zero point range (i.e. when the laser 4 is pointing at a target whose range is assigned to be zero), this zero point phase can be subtracted from the relative phase obtained above. The resultant corrected phase is the relative phase difference between the zero point range and the target range.

In this illustrated embodiment, the zero point range is established by steering the gimbal mounted mirror 12 into a retroreflecting position. This defines the zero point range to be at the surface of the mirror 12 on the gimbal 13. Distance can be determined from the phase measurements. The manner of calculating the target distance from the phase information will be discussed with reference to the following symbol definitions:

| | |
|---|---|
| intensity modulation frequencies: | $\upsilon_i$ |
| intensity modulation wavelengths: | $\lambda_i = c/\upsilon_i$ |
| synthetic wavelengths: | $\Lambda_{ij} = c/(\upsilon_i - \upsilon_j)$ |
| measured target phase for $\lambda_i$: | $\theta_i^t$ |
| measured reference phase for $\lambda_i$: | $\theta_i^r$ |
| relative phase for $\lambda_i$: | $\phi_i = \theta_i^r - \theta_i^t$ |
| relative phase for $\Lambda_{ij}$: | $\Phi_{ij} = \phi_i - \phi_j$ |
| phase offsets at zero point: | $\Phi_{ij}(0); \phi_i(0)$ |
| zero-point corrected phases: | $\Phi'_{ij} = \Phi_{ij} - \Phi_{ij}(0); \phi'_i = \phi_i - \phi_i(0)$ |
| modulation "fringe" number: | $m_i$ = integer + $\phi'_i/2\pi$ |
| synthetic fringe number: | $M_{ij} = m_i - m_j$ = integer + $\Phi'_{ij}/2\pi$ |
| refractive index of air: | n |
| distance to be measured: | $L = m_i\lambda_i/2n$ |

The algorithm used in calculating the distance from the phase measurements is as follows for the case of three frequencies: From these measured values, calculate the relative phases $\phi'_1$, $\Phi'_{21}$, $\Phi'_{31}$, as discussed above and record the relative phases as numbers between 0 and $2\pi$ (note that these values involve fixed zero-point phase offsets $\phi'_1(0)$, $\Phi'_{21}(0)$, $\Phi'_{31}(0)$). In this embodiment, $\Lambda_{31} < \Lambda_{21}$. Now calculate $$M_{21} = \Phi'_{21}/2\pi,$$

$$M_{31} = \frac{\Phi'_{31}}{2\pi} + I\left(\frac{M_{21}\Lambda_{21}}{\Lambda_{31}} - \frac{\Phi'_{31}}{2\pi}\right),$$

and

-continued $$m_1 = \frac{\phi'_1}{2\pi} + I\left(\frac{M_{31}\Lambda_{31}}{\lambda_1} - \frac{\phi'_1}{2\pi}\right);$$

where I() is a function which returns the integer nearest to its argument. The distance is then $$L = m_1\lambda_1/2n.$$

To make a range measurement, the phase differences are measured at all three modulation frequencies. To initialize the measurement process, these phase differences have to be measured at a zero-point range. The frequency generators 1, 2 are switched to the different frequency pairs and phase measurements are made. These measured phases are the zero point phases that will be subtracted from relative phase measurements from the targets. A range measurement to an arbitrary target is made by moving the gimbal-mounted mirror 12 to point the beam to the target, and making phase measurements at all modulation frequencies. By subtracting off the zero point phases from the relative phases for a target, the corrected phases for that target are obtained. From these corrected phases, the unambiguous range can be determined by the above calculation for ranges that span less than half the maximum synthetic wavelength $\Lambda_{21}$.

Determining the absolute range with optimal accuracy requires a precise knowledge of the refractive index of air. This is obtained by monitoring the temperature and pressure of the ambient air with monitoring unit 26. Such units are commercially available and can supply data which can be used to calculate the refractive index to better than 1 part per million. For higher accuracy, the humidity can also be measured by commonly available means.

The illustrated embodiment of FIG. 1 includes the provision of a mechanism for accurately aiming the optical beam at the targets 14a, b, c. The direction of the outgoing optical beam 27 is determined by the position of the mirror 12 mounted on two axis gimbals 13. An angular accuracy on the order of 3.5 microradians can be achieved by well-known, commercially available gimbal systems. Provided that beam 27 can be pointed accurately at the apex of a target, the transverse position accuracy that can be achieved is the product of the range times the angular accuracy. Accuracies of 0.003 inches can be achieved for ranges out to 70 feet, assuming perfect pointing accuracy. The tracking algorithm used in the preferred embodiment to maintain accurate pointing of the beam at the target's apex is described below.

Before making a measurement of a target, the alignment of the optics should be checked and noted. Referring to FIG. 1, this can be done automatically by the computer 24 controlling the gimbals 13 and data acquisition, thus eliminating the chance for human error. The computer 24 is interfaced to the gimbals 13 via a control box 28. The gimbals 13 are first put in a retroreflecting position such that the light from laser 4 reflects off the mirror 12 and back into the fiber 6. A coupler 29 between the fiber 6 and the laser 4 picks off a small percentage of the light and transmits it through a fiber 31 to a power meter detector 32 whose output is fed to the computer 24. The computer 24 instructs the control box 28 to adjust the gimbals 13 until the power meter 32 shows that the power being returned is maximized.

Correct alignment will also yield a maximum return on detector 16 at this point. This could optionally be used to check alignment, if desired.

The elevation and azimuth axis position is then noted. With the gimbal in the retroreflecting position, the coordinates of the centroid of the returned laser spot on the quadrant detector 33, which receives light reflected by beamsplitter 9, is noted in the computer 24. These will be referred to as the null positions.

The illustrated embodiment also includes a provision to aid the user in pointing the mirror 12 at a new target. A visible light point source 34 is directed in a diverging beam by beamsplitters 36 and 10 out toward the desired target, say 14c for purposes of illustration. The visible light from point source 34 is retroreflected by the target 14c, retraces its path, and is reflected by dichroic beamsplitter 10 onto a visible camera 37. A commercial video camera with autofocus works well in this application. Camera 37 will show the image of the target and its surroundings as illuminated by ambient light on a video monitor 35 (shown in FIG. 4) as well as the light from point source 34 that is retroreflected, which causes a bright spot on the camera's image where a target is located. In the illustrated embodiment, the video image is input to the computer 24. The computer 24 then commands the gimbal 13 to move until the bright spot of the target is centered in the image from the visible camera 37 (alternatively, this could be done manually, checking the centering of the bright spot by visual inspection). This assumes that camera 37 is aligned such that when the light beam from laser 4 is pointing directly at the apex of a target, the target is centered in the image on the visible camera 37. This step roughly aligns the gimbal 13 such that the laser beam is at least overlapping enough of the target 14c to create a return beam. The return beam is reflected by beamsplitter 9 onto the IR quadrant detector 33.

Once the mirror 12 is pointing to a target such that there is a return beam on the retroreflectors, the gimbal 13 is scanned across the target while the power of the return beam is monitored by either the high speed detector 16 or the power meter 32. From the transverse coordinate information and the power of the return beam at each location, the angular position of the centroid of the target is calculated. The gimbal 13 is then steered to that angular position. A range measurement is then taken and recorded in the computer 24 for use in deriving the transformation matrix. The azimuth and elevation angles are then individually stepped a small precise amount and the centroid of the return beam is noted. From the centroid positions in the two transverse steps and the range, a transformation matrix that scales offsets on the quadrant detector to deviations in pointing can be computed. Once computed for one target, the transformation matrix can be used for all targets on a test piece provided the alignment is sufficiently correct. The matrix must be scaled by the range and be rotated as the gimbal rotates. Alternatively, the transformation matrix can be computed for each target, or the matrix can be permanently stored, provided the instrument's alignment is unchanged.

For subsequent targets, the mirror 12 is roughly centered on a target (by scanning for maximum power return) and the range is measured. The transformation matrix can then be either rederived by stepping the gimbal 13 or transformed and scaled from the matrix derived from the initial target and the measured range.

Tracking of the target is performed by measuring the centroid position on the quadrant detector 33 (or other suitable detector) and comparing it to the null positions measured during initial alignment. The error is transformed into an angular correction by the transformation matrix and this correction is added to the current gimbal position. The gimbals are then steered to the corrected positions and the range is then measured. The angular and range information may be displayed on a monitor 40 (shown in FIG. 4) as spherical coordinates or transformed to Cartesian coordinates. The tracking can then be repeated or another target can be selected. To reduce the noise in the centroid measurements of the quadrant detector, the measurements can be averaged or a gain can be multiplied by a correction factor that is less than unity.

Figure 4:
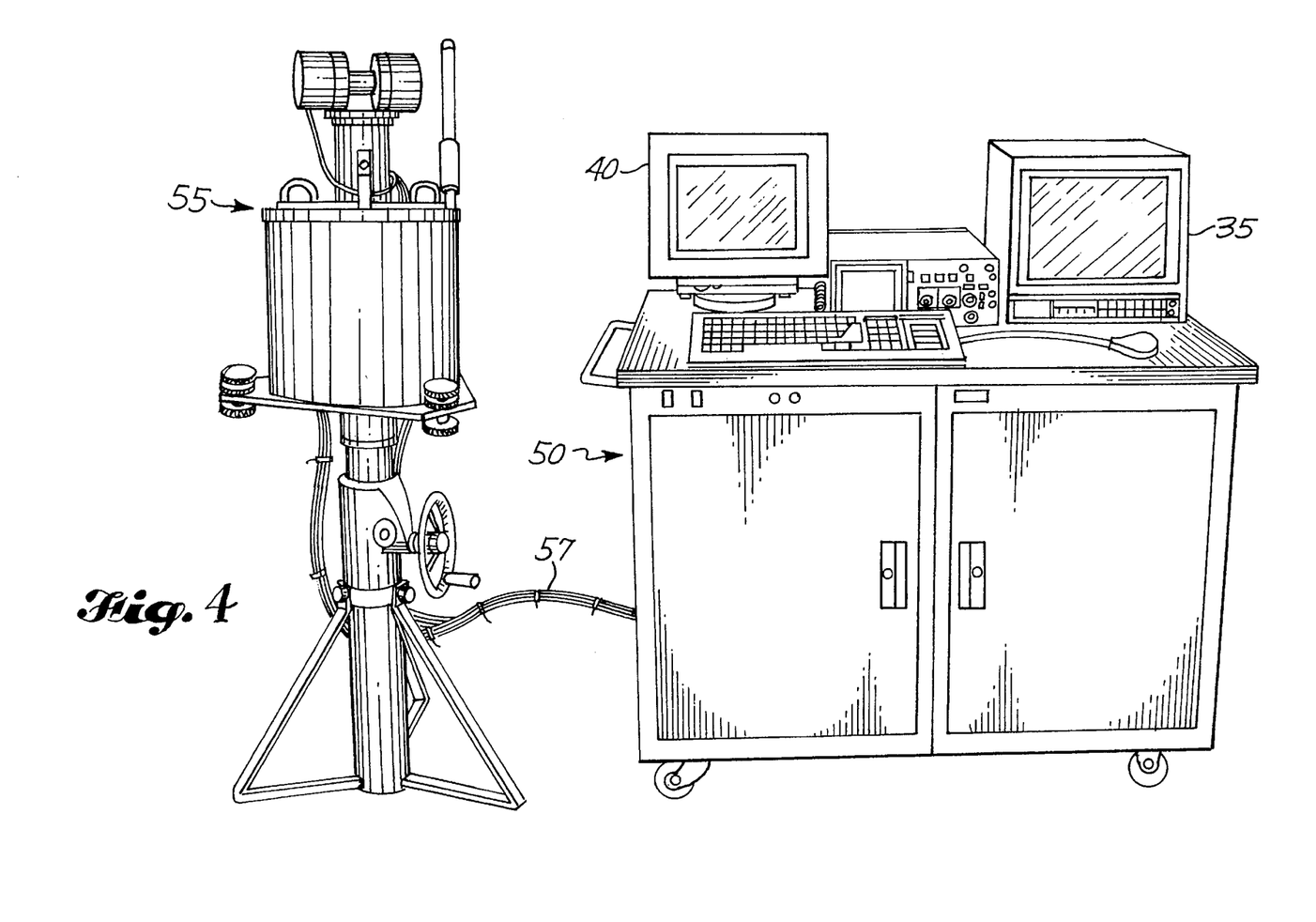
FIG. 4 is a perspective view of the invention as it may be packaged for use in an industrial environment.

The components of the illustrated embodiment can be packaged for ease of use on a factory floor. As shown in FIG. 1, the components can be separated into signal components 38 and processing components 39. With reference to FIG. 4, the processing components 39 are preferably mounted on a rolling operator's cart 50, which also carries the video monitors 35 and 40. The signal components 38 are preferably incorporated into a compact tracking head 55. The cables 41a–i which form connections between components in the operator's cart 50 and tracking head 55 can be bundled in a single umbilical cord 57. This allows the compact tracking head 55 to be easily mobile relative to the cart 50. The configuration illustrated in FIG. 1 minimizes the effects of phase measurement errors due to path length differences in the cables 41a–i between the signal components 38 and processing components 39. It should be noted that, for clarity of illustration, only signal and control lines between the signal components 38 and processing components 39 are drawn. Additional power lines could be included in the umbilical cord 57 as needed.

Figure 2:
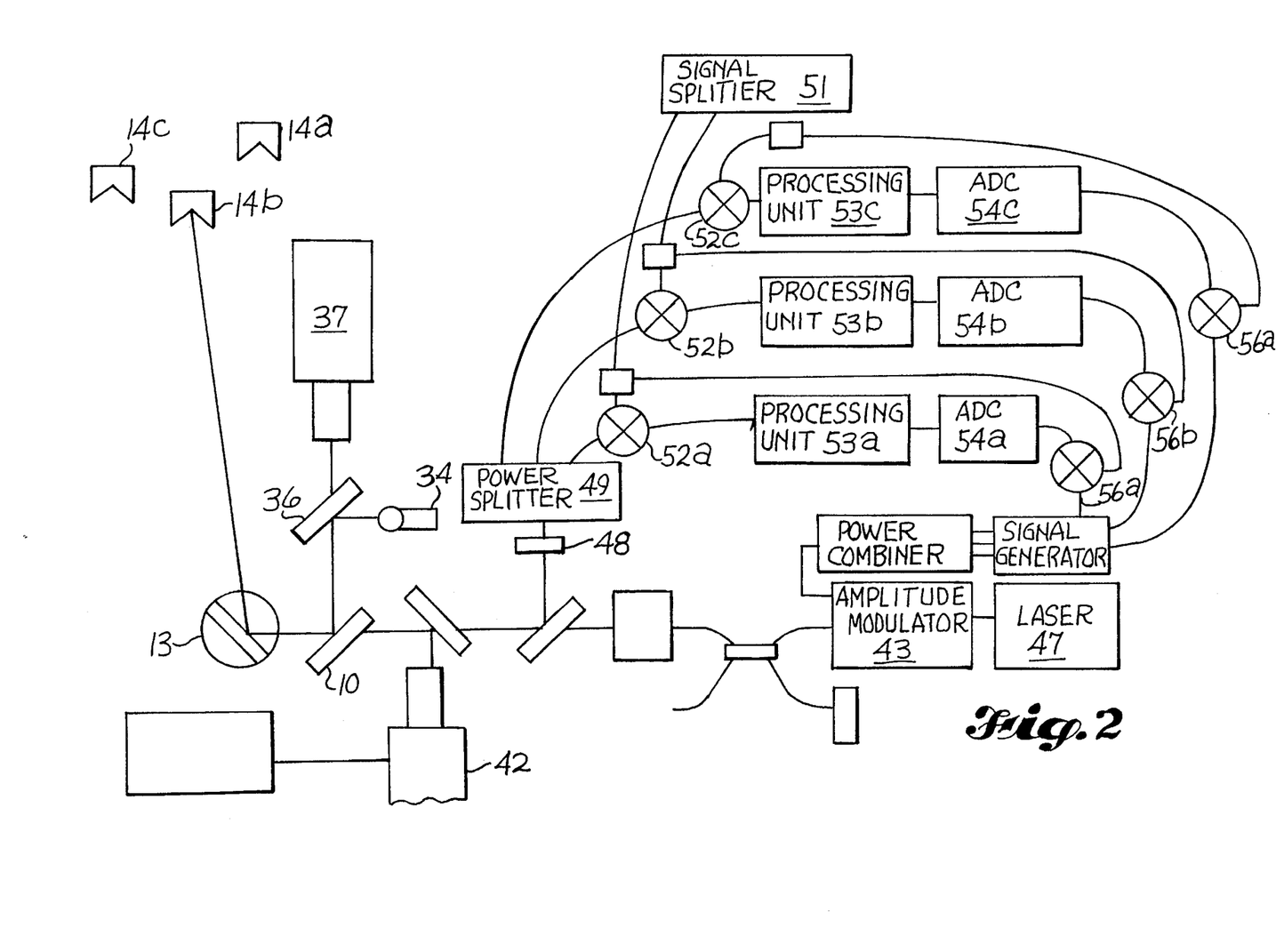
FIG. 2 is a schematic diagram of a second embodiment of the invention.
Figure 3:
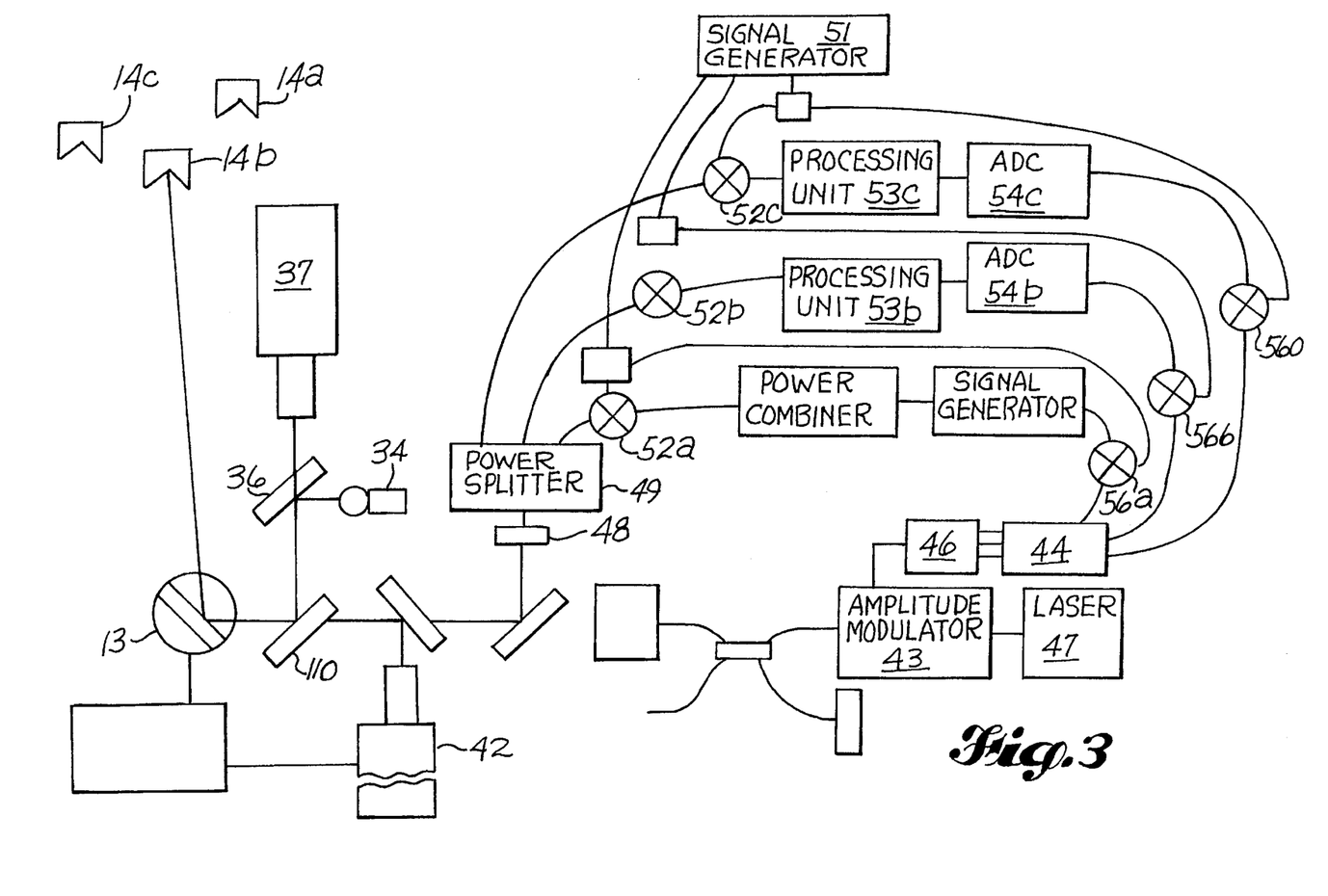
FIG. 3 is a schematic diagram of a third embodiment of the invention.

Several alternative embodiments are possible, replacing one or more parts of the FIG. 1 embodiment with alternatives described below as illustrated in FIGS. 2 and 3. In these figures, like elements have been given like reference numbers.

The quadrant detector 33 of the FIG. 1 embodiment could be replaced by a camera 42, shown in FIG. 2, that is interfaced with a frame grabber in the computer 24. Centroid estimates are then done digitally. In the FIG. 2 embodiment, the first signal generator 44 could simultaneously output three signals, each at a different modulation frequency. The three signals are combined by power combiner 46 before modulating the laser beam from the laser 47 through an external amplitude modulator 43. Thus, the output laser beam is modulated by three tones simultaneously. The signal detected by detector 48 includes all three tones and is split by power splitter 49. The individual signals could be phase detected by mixing each of them with one of three local oscillator frequencies generated by a second signal generator 51. The local oscillator frequencies are each offset at a fixed frequency from the three modulation frequencies, as was described above in connection with the FIG. 1 embodiment. Each of three mixers 52a, 52b, 52c has a different local oscillator frequency. The output of the mixers 52a, 52b, 52c are signals at the offset frequency. The signals from the mixers 52a, 52b, 52c are bandpass filtered and amplified by processing units 53a, 53b, 53c before being recorded by analog to digital converters 54a, 54b, 54c, respectively. Simultaneously, the analog to digital converters 54a, 54b, 54c are recording signals generated by mixing the outputs of the first signal generator 44 with each of the three local oscillator signals generated by the second generator 51 in mixers 56a, 56b, 56c. The signals from the first signal generator 44 are matched with the respective local oscillator signals from the second generator 51. The six recorded signals are then used in the algorithm described in connection with the FIG. 1 embodiment to obtain the absolute range of the targets.

The advantage of the simultaneous operation of the FIG. 2 embodiment is a significant reduction in latency. This enables the tracker to follow the range of targets at significantly higher radial velocities since no extrapolation of the phases is required. There are, however, a greater number of components compared to the FIG. 1 embodiment and possibly an increase in error due to the loss in signal strength that comes from splitting the return signal and reducing the amplitude of the input powers so that the modulation of the laser beam is not saturated.

FIG. 3 shows another alternative embodiment in which a visible laser 61 is used to produce a tracer beam that is copropagating with the IR beam from the laser 62. The visible beam is reflected from beamsplitter 68 and dichroic beamsplitter 64 before being directed at one of the targets 14a, 14b, 14c. The return beam is reflected by the dichroic beamsplitter 64 into a camera 65. The output of camera 65 is used to estimate the centroid of the return HeNe laser beam and the signal sent to the gimbals 13 to keep them pointing at the apex of the target. Rather than use the camera 65, the beam could be reflected by beamsplitter 68 into a quadrant detector 69. In either case, the initial alignment and measurement of the null position is performed in a manner similar to that described above. Adding a visible beam for tracking results in a factor of two reduction in the angular beam divergence due to diffraction. It also provides a tracer beam that can be seen with the unaided eye when manually steering the gimbals, and allows for the use of a visible light camera or quadrant detector for tracking rather than more expensive infrared ones.

Referring again to FIG. 3, the RF reference signal of the FIG. 1 embodiment could be replaced by an optical reference signal. This is done by sampling the laser beam reflected by beamsplitter 71 and 72 onto detector 73. The signal is then mixed in a mixer 76a with the current local oscillator frequency. The resultant signal is filtered and amplified by processing electronics 77a and recorded by analog to digital recorder 78a. The reference phase obtained from this signal is functionally the same as that obtained solely from RF signals, as described above. The advantage is that if dynamic phase shifts occur in the modulation of the laser or if the RF/optical path distance from the signal generator 74 to the beamsplitter 71 varies in time due to environmental variations, the optical reference will compensate for these variations.

Rather than obtaining the index of air by monitoring the temperature, pressure and humidity of the ambient air, a calibration arm could be used to measure the refractive index of air. This is done by, in addition to the optical reference just mentioned, a second detector 81 which samples the beam reflected by beamsplitter 71. The distance from beamsplitter 72 to detector 81 and the distance from beamsplitter 72 to detector 73 must be known and maintained to high precision. This can be done by mounting these elements on a thermally stable material such as Super Invar or Zerodur glass. The signal from the second detector 81 is mixed with the local oscillator frequencies in mixer 76c, filtered and amplified by processing electronics 77c, and recorded by analog to digital converter 78c. The phase information from the analog to digital converters 78a and 78c are used to obtain the calculated distance in vacuum represented by the path difference between the path to detector 73 and to detector 81. The known path difference is then divided by the calculated vacuum path difference to obtain the current refractive index of air. The calibration arm can also be used to compensate for uncertainties in the modulation frequencies.

The return signal is reflected from target 14b to detector 63. It is mixed with signals from the local oscillator in mixer 76b. The output of mixer 76b is filtered and amplified by processing electronics 77b and recorded by analog to digital recorder 78b.

The preferred embodiment includes a phase detection method based on mixing of the target signal with a local oscillator signal whose frequency is offset from the first. The signal is sampled and digital IQ detection is performed. There are several alternative phase detection schemes known to those skilled in the art that could be used.

While preferred embodiments have been described, those skilled in the art will recognize modifications or variations which might be made without departing from the inventive concept. Therefore, the description and claims should be interpreted liberally with only such limitation as is necessary in view of the pertinent prior art.

What is claimed is:

1. A device for measuring the distance to a target comprising:

means for generating an optical signal;

means for producing a plurality of modulation signals;

means for combining said optical signal with said modulation signals to produce a modulated output signal which is intensity modulated at a plurality of frequencies;

optical elements for directing said modulated output signal to said target and directing back a return signal reflected from said target, said optical elements including a mirror and a gimbal upon which said mirror is mounted for movement to a position where it reflects said modulated output signal onto said target;

a detector for detecting the return signal reflected back from said target;

a gimbal position control;

a power meter for measuring the power of the return signals;

a signal generator which generates reference signals, each of which is offset in frequency from a corresponding one of the intensity modulation frequencies by a predetermined amount;

means for combining the return signals with the reference signals to form a first set of intermediate frequency signals, each of which corresponds to one of said intensity modulation frequencies;

means for combining the modulation signals with the reference signals to form a second set of intermediate frequency signals, each of which corresponds to one of said intensity modulation frequencies; and a computer for calculating a set of phase differences between said output beam and said return signals for each of said modulation frequencies from the first and second set of intermediate frequencies, and determining the distance to the target from said phase differences, and for receiving input from said power meter and to output instructions to said gimbal control so as to adjust the position of said gimbal to maximize the power of said return signals.

2. The device of claim 1 wherein said means for generating an optical output signal includes a laser and a signal generator which generates modulation signals at a plurality of modulation frequencies which vary the excitation current to said laser so as to intensity modulate the output of said laser at said plurality of modulation frequencies.

3. The device of claim 2 wherein said means for combining the return signals with the reference signals comprises a first mixer.

4. The device of claim 3 wherein said means for combining the modulation signals with the reference signals comprises a second mixer.

5. The device of claim 4 wherein said modulation signals are microwave signals.

6. The device of claim 5 wherein said plurality of modulation frequencies comprises three frequencies.

7. The device of claim 1 wherein said plurality of modulation signals are generated sequentially.

8. The device of claim 1 wherein said plurality of modulation signals are generated simultaneously.

9. A device for measuring the distance to a target comprising:

a laser having an output beam;

a first signal generator having its output coupled to said laser so as to modulate the intensity of the output beam of said laser at a plurality of modulation frequencies;

a detector for detecting a return signal reflected from said target and outputting a detected signal;

optical elements for directing said laser output beam to said target and directing said return signal to said detector wherein said optical elements include a mirror mounted on a two-axis gimbal;

a second signal generator which generates reference signals at a plurality of frequencies each of which is offset from a corresponding one of said modulation frequencies by a substantially fixed amount;

a first mixer to receive said detector signal and said reference signal and output a first intermediate frequency signal;

a second mixer to receive said first mixer signal generator output and said reference signal and output a second intermediate frequency signal;

at least one analog-to-digital converter for digitizing said first and second intermediate frequency signals;

a computer to receive said digitized signals and calculating phase differences therebetween; and     means for moving said gimbal, in response to output from said computer to a position where power of the return signal is maximized.

10. The apparatus of claim 9 further comprising an oscillator, wherein said first signal generator and said second signal generator are both phase-locked to said oscillator.

11. The apparatus of claim 10 further comprising a power meter for measuring the power of the return signal and inputting a measurement of said power to said computer.

* * * * *